US012681840B2

(12) United States Patent
Zhang et al.

(10) Patent No.: US 12,681,840 B2
(45) Date of Patent: Jul. 14, 2026

(54) METHOD, ELECTRONIC DEVICE, AND COMPUTER PROGRAM PRODUCT FOR TEST CASE GENERATION

(71) Applicant: Dell Products L.P., Round Rock, TX (US)

(72) Inventors: Yongmei Zhang, Chengdu (CN); Fangbin Zhou, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 295 days.

(21) Appl. No.: 18/650,971

(22) Filed: Apr. 30, 2024

(65) Prior Publication Data

US 2025/0315366 A1 Oct. 9, 2025

(30) Foreign Application Priority Data

Apr. 3, 2024 (CN) .......................... 202410404767.4

(51) Int. Cl.
*G06F 11/3668* (2025.01)

(52) U.S. Cl.
CPC ................................ *G06F 11/3684* (2013.01)

(58) Field of Classification Search
CPC .................................................. G06F 11/3684
USPC ............................... 717/124–140; 706/25–45
See application file for complete search history.

(56) References Cited

U.S. PATENT DOCUMENTS

| | | | | | |
|---|---|---|---|---|---|
| 5,629,878 | A | * | 5/1997 | Kobrosly | ............. G05B 13/028 714/48 |
| 6,242,975 | B1 | * | 6/2001 | Eidson | .................. H03F 1/0222 330/149 |
| 7,024,399 | B2 | * | 4/2006 | Sumner, II | ............. G16H 10/20 706/45 |
| 7,370,296 | B2 | * | 5/2008 | Koyfman | ............ G06F 11/2257 716/106 |
| 8,949,863 | B1 | | 2/2015 | Coatney et al. | |
| 9,209,973 | B2 | | 12/2015 | Aikas et al. | |
| 9,444,822 | B1 | | 9/2016 | Borowiec et al. | |

(Continued)

OTHER PUBLICATIONS

Dimillo et al., "Experimental Results from an Automatic Test Case Generator", ACM, pp. 1-19 (Year: 1993).*

(Continued)

*Primary Examiner* — Anil Khatri
(74) *Attorney, Agent, or Firm* — Ryan, Mason & Lewis, LLP

(57) ABSTRACT

Illustrative embodiments include a method, an electronic device, and a computer program product for test case generation. The method includes, in response to a target function of a system being developed, determining updated knowledge, corresponding to the target function, in a knowledge base for the system. The method further includes identifying at least one test path from the updated knowledge in the knowledge base based on a predetermined test range for the target function. The method further includes extracting a test object from each of the at least one test path to generate a test case for the target function. By this method, ontology-based automatic generation of test cases can be realized. For example, whenever a product is iteratively updated, incremental knowledge is used as a test target, which can ensure comprehensive coverage of a test strategy without missing any test points, while also improving efficiency and case quality.

20 Claims, 8 Drawing Sheets

(56)　　　　　References Cited

U.S. PATENT DOCUMENTS

|  |  |  |  |
|---|---|---|---|
| 9,465,653 B2 | 10/2016 | Kishore et al. | |
| 10,212,031 B2 | 2/2019 | Subramanian et al. | |
| 10,430,323 B2 * | 10/2019 | Raman | G06F 11/3688 |
| 10,991,053 B2 * | 4/2021 | Pingali | G06Q 40/12 |
| 11,074,163 B2 * | 7/2021 | Ferguson | G06N 20/00 |
| 11,301,152 B1 | 4/2022 | Sillifant | |
| 11,347,628 B2 * | 5/2022 | Baba | G06F 11/3684 |
| 2005/0223046 A1 | 10/2005 | Smith | |
| 2013/0080624 A1 | 3/2013 | Nagai et al. | |
| 2016/0357439 A1 | 12/2016 | Uehara et al. | |
| 2021/0026865 A1 | 1/2021 | He et al. | |
| 2022/0253467 A1 | 8/2022 | Zhang | |

OTHER PUBLICATIONS

Mingsong et al., "Automatic Test Case Generation for UML Activity Diagrams", ACM, pp. 1-7 (Year: 2006).*
Wang et al., "A New Automatic Knowledge Extraction Method for Course Documents Applied in the Web-based Teaching System", IEEE, pp. 1-6 (Year: 2015).*
H. L. Lutfiyya et al., "Configuration Maintenance for Distributed Applications Management," Journal of Network and Systems Management, Jun. 2000, 15 pages.

* cited by examiner

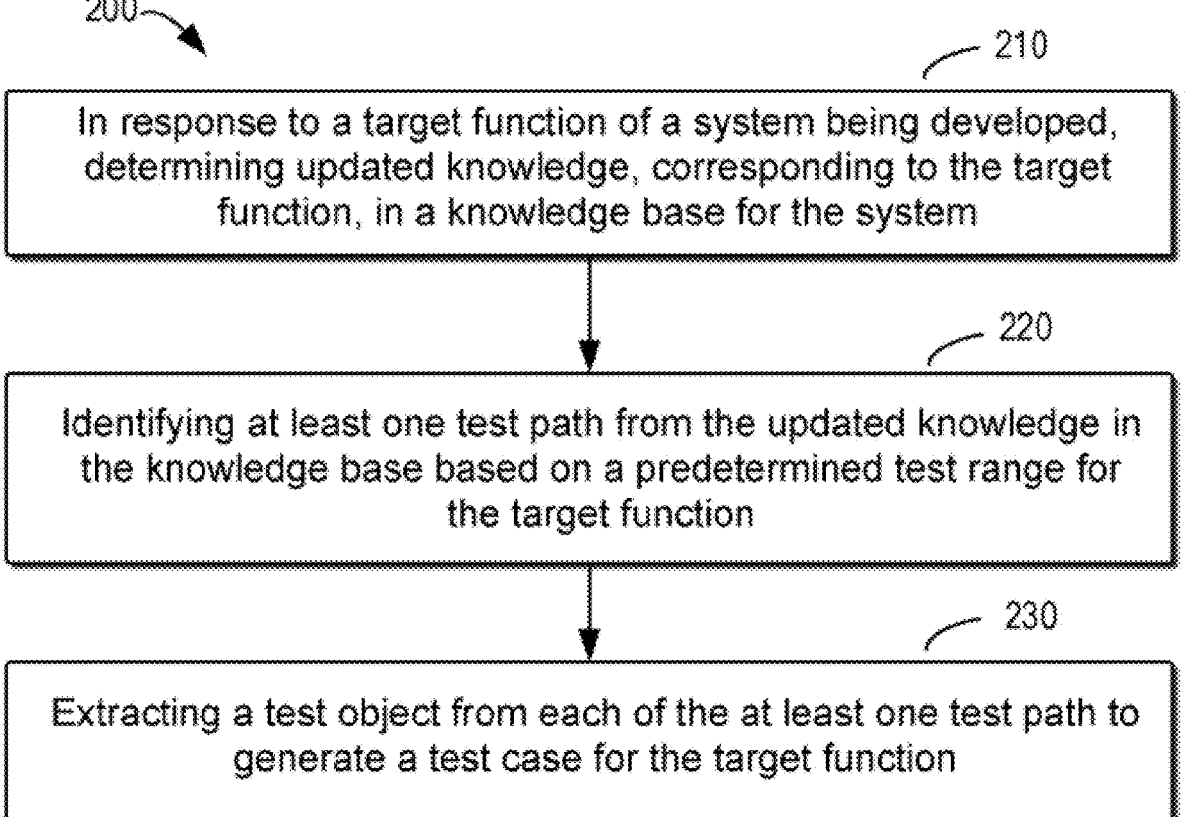

200

210

In response to a target function of a system being developed, determining updated knowledge, corresponding to the target function, in a knowledge base for the system

220

Identifying at least one test path from the updated knowledge in the knowledge base based on a predetermined test range for the target function

230

Extracting a test object from each of the at least one test path to generate a test case for the target function

FIG. 2

Algorithm 1: Action extraction

Requirements: Principal line with nodes

```
1: action, input, output
2: foreach principal line in principal lines:
3:        foreach node in principal line:
4:                # scenario 1:
5:                # e.g., Add_witness_server (cluster A, witness_session_on_A)
6:                if node.attribute == operation:
7:                        action = node
8:                        input = node.upstream_node
9:                        output = node.downstream_node
10:               end if
11:               # scenario 2:
12:               # e.g., Validate (witness_session_on_A, OK)
13:               if node.attribute == state:
14:                       action = "validate"
15:                       input = node.upstream_node
16:                       output = node
17:               end if
18:       end for
19:       return  One or more structured data actions (input, output) of a principal line
20: end for
21: return    A file in a portable syntax format of structured data action (input, output) of all principal lines
```

FIG. 6

Algorithm 2: Statement construction

Requirement: From one or more structured data actions (input, output) of a principal line

```
1: foreach action in actions:
2:        if action == PSO operation:
3:                # syntax 1:
4:                # e.g., Add_witness_server (cluster_A, witness_session_on_A)
5:                if input == testbed:
6:                        syntax = action + "to" + input + "and query"+ output
7:                end if
8:                # syntax 2:
9:                # e.g.,Configure_Metro_VG (VG1, metro_session_vg1)
10:               if input == PSO resource:
11:                       syntax = action + "on" + input +"to get" + output
12:               end if
13:               # syntax 3:
14:               # e.g., Failover (replication_session1, failed_over)
15:                       syntax = action + input + "and check the state of" + output
16:               end if
17:       # syntax 4:
18:       # e.g., Validate (metro_session_vg1, active-active)
19:       if action == "validate":
20:               syntax = "validate" + input + "until" + status
21:       end if
22:                       Annotate action/input/output with its entry name
23: end for
24: return    Annotate one or more statements having an entry name
```

FIG. 7

1. Add witness service [PSO operation: Add Witness Service] to cluster A [PSO entity: Power Store].
2. Query witness_session_on_A [PSO entity: Witness Session) added to cluster A [PSO entity: Power Store].
3. Delete witness_session_on_A [PSO entity: Witness Session) on cluster A [PSO entity: Power Store].
4. Query witness [PSO entity: Witness Session] deleted
5. Add witness service [PSO operation: Add Witness Service] to cluster A [PSO entity: Power Store] again
6. Add witness service [PSO operation: Add Witness Service] to cluster Z [PSO entity: Power Store].
7. Create volume groups [PSO entity: Volume Group) on cluster A [PSO entity: Power Store].
8. Create a remote system [PSO entity: Remote System]
9. Configure metro vg [PSO operation: Configure Metro VG] from cluster A [PSO entity: Power Store] to Z [PSO entity: Power Store].
10. Query metro session_vg1 [PSO entity: Metro VG Session] on VG1 [PSO entity: Volume Group] on cluster A [PSO entity: Power Store]

FIG. 8

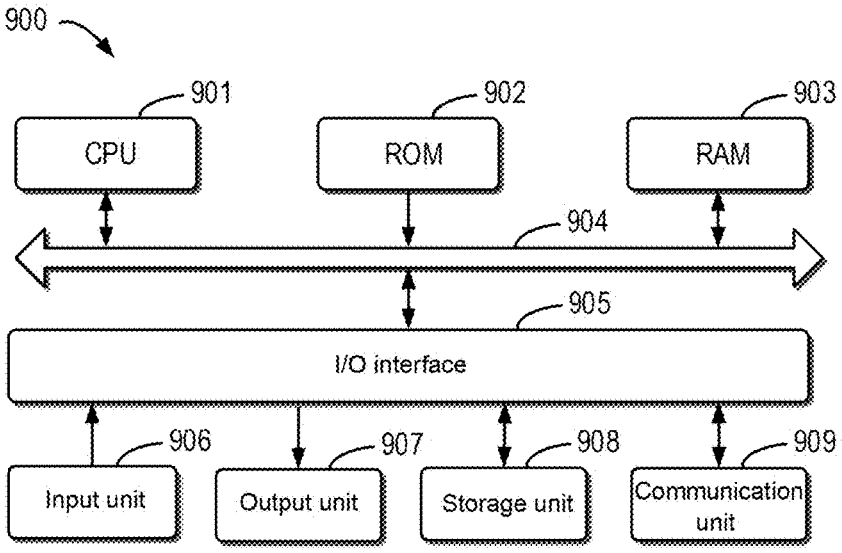

FIG. 9

METHOD, ELECTRONIC DEVICE, AND COMPUTER PROGRAM PRODUCT FOR TEST CASE GENERATION

RELATED APPLICATION

The present application claims priority to Chinese Patent Application No. 202410404767.4, filed Apr. 3, 2024, and entitled "Method, Electronic Device, and Computer Program Product for Test Case Generation," which is incorporated by reference herein in its entirety.

FIELD

Embodiments of the present disclosure relate generally to the field of computers, and more particularly, to a method, an electronic device, and a computer program product for test case generation.

BACKGROUND

Tests illustratively involve backtracking and validation of development, aiming at comprehensively detecting possible defects, bugs, and any behaviors that are contrary to the expectations of a developed product (e.g., a single or multiple functions, or an entire system). Such tests may typically include multiple aspects such as case design, test environment setup, test execution, result analysis, and defect tracking.

By testing a product, various aspects of the product can be analyzed in depth, such as its performance, stability, security, and compatibility. In addition, test engineers can also examine the usability, interaction logic, and other aspects of the product from a user's perspective to see if there are any problems. The test feedback of the product is then provided to development teams, which helps them to further improve the product.

SUMMARY

Embodiments of the present disclosure provide a solution for test case generation. Such automatic generation of test cases enables a test strategy to cover test points comprehensively, and improves the efficiency of case generation while ensuring the case quality.

In a first aspect of the present disclosure, a method for test case generation is provided. The method includes, in response to a target function of a system being developed, determining updated knowledge, corresponding to the target function, in a knowledge base for the system. The method further includes identifying at least one test path from the updated knowledge in the knowledge base based on a predetermined test range for the target function. The method further includes extracting a test object from each of the at least one test path to generate a test case for the target function.

In another aspect of the present disclosure, an electronic device for test case generation is provided. The electronic device includes at least one processor and a memory, the memory being coupled to the at least one processor and storing instructions, and the instructions, when executed by the at least one processor, causing the electronic device to perform actions. The actions include: in response to a target function of a system being developed, determining updated knowledge, corresponding to the target function, in a knowledge base for the system. The actions further include identifying at least one test path from the updated knowledge in the knowledge base based on a predetermined test range for the target function. The actions further include extracting a test object from each of the at least one test path to generate a test case for the target function.

In still another aspect of the present disclosure, a computer program product is provided. The computer program product is tangibly stored on a non-transitory computer-readable storage medium and includes computer-executable instructions. The computer-executable instructions, when executed by at least one processor of a computer, cause the computer to perform a method or process according to embodiments of the present disclosure.

With the solution for test case generation according to embodiments of the present disclosure, ontology-based automatic generation of test cases can be realized. Whenever a product is iteratively updated, incremental knowledge is used as a test target, which can ensure comprehensive coverage of a test strategy without missing any test points, and improve the efficiency of case generation while ensuring the case quality.

It should be noted that this Summary is provided to introduce a series of concepts in a simplified manner, and these concepts will be further described in the Detailed Description below. The Summary is neither intended to identify key features or necessary features of the present disclosure, nor intended to limit the scope of the present disclosure.

BRIEF DESCRIPTION OF THE DRAWINGS

By description of embodiments of the present disclosure, provided in further detail herein with reference to the accompanying drawings, the above and other objectives, features, and advantages of the present disclosure will become more apparent, in which:

FIG. 2 is a flow chart of a method for test case generation according to an embodiment of the present disclosure;

FIG. 6 is a diagram illustrating an algorithm for forming structured data corresponding to an extracted test object according to an embodiment of the present disclosure;

FIG. 7 is a diagram illustrating an algorithm for generating a descriptive statement according to an embodiment of the present disclosure;

FIG. 8 is a diagram illustrating an example of descriptive statements generated according to an embodiment of the present disclosure; and FIG. 9 is a block diagram of an example device that may be used to implement some embodiments of the present disclosure.

Throughout all the drawings, the same or similar reference numerals generally represent the same or similar elements.

DETAILED DESCRIPTION

Figure 1:
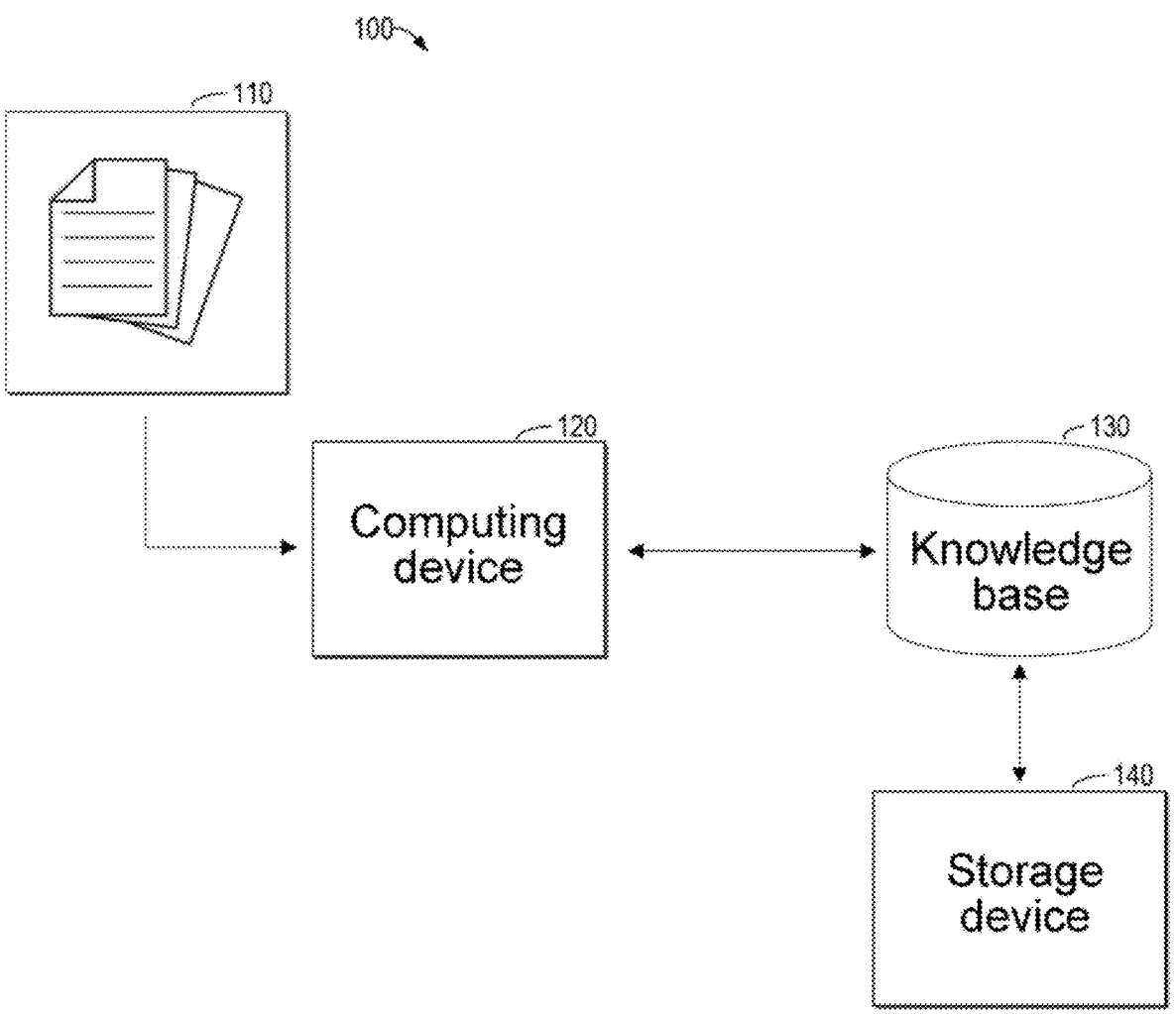
FIG. 1 is a schematic diagram of an example environment in which a method and/or a process according to an embodiment of the present disclosure can be implemented.

Illustrative embodiments of the present disclosure will be described below in further detail with reference to the accompanying drawings. Although certain embodiments of the present disclosure are illustrated in the accompanying drawings, it should be understood that the present disclosure can be implemented in various forms and should not be construed as being limited to the embodiments set forth herein. Rather, these embodiments are provided for more thorough and complete understanding of the present disclosure. It should be understood that the accompanying drawings and embodiments of the present disclosure are for illustrative purposes only, and are not intended to limit the protection scope of the present disclosure.

In the description of embodiments of the present disclosure, the term "include" and its variations should be understood as open-ended inclusion, i.e., "including but not limited to." The term "based on" should be understood as "based at least in part on." The term "one embodiment" or "the embodiment" should be understood as "at least one embodiment." The terms "first," "second," and the like may refer to different or identical objects, unless otherwise specifically indicated.

As mentioned above, test operations facilitate product development. A test process may include, but is not limited to, multiple aspects such as case design, test environment setup, test execution, result analysis, and defect tracking. Typically, the test process begins with the case design. For example, a test engineer analyzes documents from developers, extracts all test points, and then writes steps to cover all the test points. After a test case is written, the next step is to execute the case and encode a script.

However, there are several challenges in solutions related to the case design. On the one hand, it is difficult to ensure the coverage of test points. This is critical to the product quality. If some test points are not covered, it may result in failure to detect some product defects. When customers encounter these defects, it may be more costly to fix them. Therefore, there is always a need for experienced test engineers to analyze test points. On the other hand, the process of converting test points into test cases may be time and labor intensive. Test inputs, execution conditions, and expected results are crucial for case execution and script encoding. They have to be clearly presented in the case description in a simple but professional form, which always leads to testing engineers spending a lot of time.

To this end, embodiments of the present disclosure provide a solution for test case generation. The solution includes, in response to a target function of a system being developed, determining updated knowledge, corresponding to the target function, in a knowledge base for the system. The solution further includes identifying at least one test path from the updated knowledge in the knowledge base based on a predetermined test range for the target function. The solution further includes extracting a test object from each of the at least one test path to generate a test case for the target function. By this method, ontology-based automatic generation of test cases can be realized. Whenever a product is iteratively updated, incremental knowledge is used as a test target, which can ensure comprehensive coverage of a test strategy without missing any test points, and improve the efficiency of case generation while ensuring the case quality.

Basic principles and some example implementations of the present disclosure are illustrated below with reference to FIG. 1 to FIG. 9. It should be understood that these example embodiments are provided merely to enable those skilled in the art to better understand and then implement embodiments of the present disclosure, and are not intended to impose any limitation to the scope of the present disclosure.

FIG. 1 is a schematic diagram of an example environment 100 in which a method and/or a process according to an embodiment of the present disclosure can be implemented. The example environment 100 exemplifies an environment in which a test case is automatically generated. As shown in FIG. 1, the example environment 100 may include a development document 110, a computing device 120, a knowledge base 130, and a storage device 140. These components may be coupled to each other for interaction, as shown in FIG. 1. It should be understood that only for the purpose of understanding and easy illustration, limited components are shown in the example environment 100 for implementing embodiments of the present disclosure, and embodiments of the present disclosure are not limited thereto. For example, the example environment 100 may further include a display (not shown) that is configured to display the development document 110, present generated test cases, or the like.

According to an embodiment of the present disclosure, the development document 110 typically follows certain writing specifications to indicate the developed product by means of, for example, clear language, precise terms, and appropriate diagrams. Moreover, the development document 110 further needs to be updated and maintained periodically to reflect iterative updating to the product. Examples of the development document 110 may include, but are not limited to, a requirement analysis document, a preliminary design document, a detailed design document, a database design document, a test document, a user manual, and the like.

The development document 110 can exhaustively articulate core elements of the developed product, such as its internal logic, module interactions, data structures, and other key information. The development document 110 can provide a clear guidance to developers and facilitate communication and collaboration among team members. In addition, due to such important information included in the development document 110, it can provide indispensable technical support and decision-making basis for subsequent maintenance, upgrading, and expansion of the product.

According to an embodiment of the present disclosure, the computing device 120 may analyze the development document 110 of the product and generate a product-specific knowledge base 130 based thereon. By using technologies such as natural language processing and image recognition, the computing device 120 can parse, extract, and summarize the development document 110, and accordingly can accurately identify the key information in the document (e.g., from text and/or diagrams), thus facilitating understanding of the logic and associations behind it. Through this process, the computing device 120 organizes the relatively dispersed information in the development document 110 into structured data to simplify the understanding of the product.

The computing device 120 may have computing power adapted to the test case generation according to an embodiment of the present disclosure. During execution of the test case generation, the computing device 120 may process the development document 110 and perform corresponding calculations to generate the product-specific knowledge base 130 and store it in the storage device 140. It should be understood that the computing device 120 is shown in FIG. 1 as one computing device, but this is only illustrative rather than restrictive, and there may be a greater number of computing devices in the example environment 100 to form a cluster. In the following text, the corresponding operations of the computing device 120 will be further described in detail.

By way of example rather than limitation, the computing device 120 may include but is not limited to a personal computer, a laptop, a server computer, a mobile device (such as a smartphone and a tablet), a wearable electronic device, a multimedia player, a personal digital assistant (PDA), a smart home device, a consumer electronics product, a distributed computing environment including any one or more of the aforementioned devices, or the like.

According to an embodiment of the present disclosure, the product-specific knowledge base 130 may characterize the product. In some embodiments, the knowledge base 130 may include one or more knowledge entries for describing various aspects of the product, and each of these knowledge entries may correspond to a single or multiple functions of the system, or the entire system, for indicating its behavior and state and the like. The knowledge entries included in the knowledge base 130 may be generated based on the development document 110 of the product. For ease of understanding and use, the knowledge entries in the knowledge base 130 may be presented in a graphical presentation pattern, a textual presentation pattern, or a combination of both. The graphical presentation pattern can intuitively display the associations and hierarchical structure between the knowledge entries, helping to quickly learn the overall framework, while the textual presentation pattern provides detailed textual descriptions and explanations, facilitating in-depth understanding of the knowledge content. The knowledge base 130 according to embodiments of the present disclosure will be described below in further detail.

According to embodiments of the present disclosure, the storage device 140 has a storage space adapted for test case generation as disclosed herein. The storage device 140 may be configured to store the product-specific knowledge base 130, as well as the generated test cases, and the like. In addition, models and their parameters, test environment configurations, etc. involved in the test process may also be stored in the storage device 140. It should be noted that the storage device 140 is shown in FIG. 1 as one storage device, but this is only illustrative rather than restrictive, and there may be a greater number of storage devices in the example environment 100.

By way of example rather than limitation, the storage device 140 may include but is not limited to a local storage device, a remote storage device, and a combination thereof. In some embodiments, a plurality of storage devices in the storage device 140 may include but are not limited to hard disk drives (HDDs), solid state drives (SSDs), solid state hybrid drives (SSHDs), and the like, and some of the plurality of storage devices may be arranged locally while others may be arranged remotely and coupled together, for example, via a line, a network, or the like.

The example environment 100 in which the method and/or process according to an embodiment of the present disclosure may be implemented has been described above with reference to FIG. 1. A flow chart of a method 200 for test case generation according to an embodiment of the present disclosure will be described below with reference to FIG. 2. By the method 200, a test case covering test points comprehensively can be generated automatically, thereby alleviating the high dependence on experienced personnel and improving the efficiency of case generation while ensuring the case quality. In addition, incremental knowledge is used as a key test target, which can ensure that test points are not missed even during iterative updating.

At block 210, in response to a target function of a system being developed, updated knowledge, corresponding to the target function, in a knowledge base 130 for the system is determined. In response to a new function being developed, or a previous function being upgraded, the knowledge base 130 will synchronize such a change to the system, for example by characterizing updated knowledge of the new function or upgraded function. Such updated knowledge corresponds to the new function or upgraded function and is stored for use to reflect the latest behaviors and actions of the system. The updated knowledge determination process according to embodiments of the present disclosure will be described below in further detail.

At block 220, at least one test path is identified from the updated knowledge in the knowledge base based on a predetermined test range for the target function. In some embodiments, the predetermined test range may be defined by a test engineer prior to a test or dynamically determined by the computing device 120 during the test based on a detected changing factor (e.g., test environment). As described above, the system is iteratively updated as its new function or upgraded function is developed, and the newly generated and stored updated knowledge in the knowledge base 130 for the system indicates such iterative updating. In the knowledge base 130, the updated knowledge in the knowledge for the system is used as a starting point to identify the one or more updated knowledge entries and the associated knowledge entries around them. By sorting out these knowledge entries, one or more case principal lines, i.e., test paths, can be determined. Test path identification according to embodiments of the present disclosure will be described below in further detail.

At block 230, a test object is extracted from each of the at least one test path to generate a test case for the target function. Each of the one or more test paths identified at block 220 relates to updated knowledge (including at least some updated knowledge entries), and each test path includes its corresponding test object, e.g., an action to be performed and a state to be validated. By extracting the test object in the test path and determining the context associated therewith, a test case for the target function is generated. Test object extraction and test case generation according to embodiments of the present disclosure will be described below in further detail.

With the method 200 for test case generation according to embodiments of the present disclosure, ontology-based automatic generation of test cases can be realized. Whenever a product is iteratively updated, incremental knowledge is used as a test target, which can ensure comprehensive coverage of a test strategy without missing any test points, and improve the efficiency of case generation while ensuring the case quality.

Figure 3:
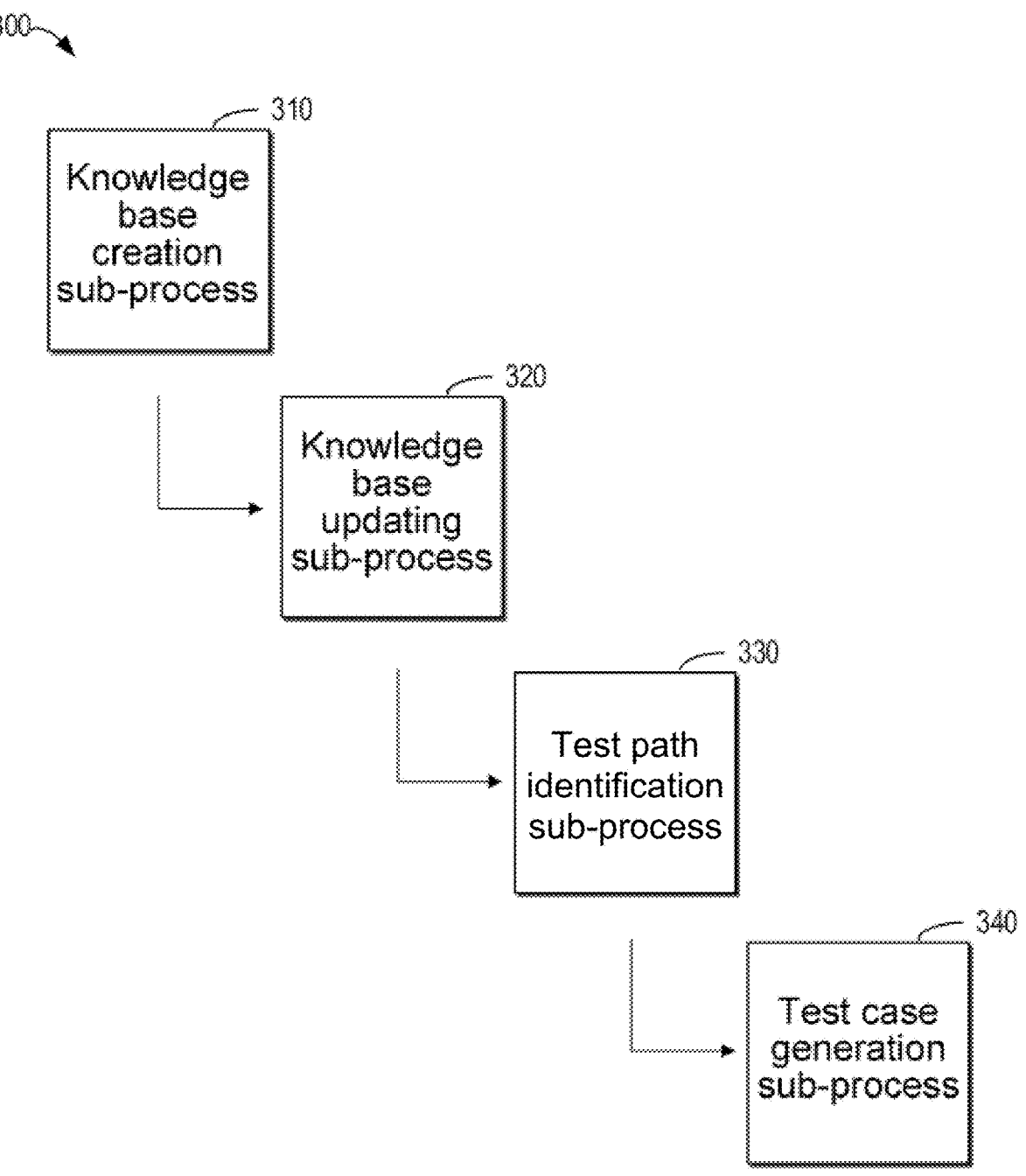
FIG. 3 is a schematic diagram of a test case generation process according to an embodiment of the present disclosure.

FIG. 3 is a schematic diagram of a test case generation process 300 according to an embodiment of the present disclosure. As shown in FIG. 3, the test case generation process 300 may include a knowledge base creation sub-process 310, a knowledge base updating sub-process 320, a test path identification sub-process 330, and a test case generation sub-process 340. The test case generation process 300 and its corresponding sub-processes 310-340 may be abstracted as a test case generation unit and corresponding subunits (e.g., a knowledge base creation subunit and a knowledge base update subunit) for each sub-process. The unit and corresponding subunits may be components or systems for test case generation implemented on the basis of software and may run on a device having computing power (e.g., the computing device 120).

According to embodiments of the present disclosure, the knowledge base creation sub-process 310 may generate knowledge entries for the system based on the development document 110 of the system. By way of example, important information and key content may be extracted from the development document 110 using technologies such as natural language processing and image recognition. The extracted part is converted into knowledge entries in a predetermined format via, for example, a suitable editor. It should be understood that embodiments of the present disclosure do not limit such extraction processes and conversion processes, which can be implemented in suitable manners selected according to specific usage needs.

In some embodiments, the knowledge base includes one or more knowledge entries about the system, and each of these knowledge entries may include an identification number, a name, a label, an attribute, a description, or an annotation. Taking a storage system as an example, a knowledge entry corresponding to a storage device A may include the identification number of "PSO0001004," the name of "storage device A," the label of "storage device A," the attribute of "resource," the description of "indicating physical hardware," and the annotation of "instance of 'PSO00000001'," where the annotation may indicate that the instance knowledge entry "PSO0001004" is an instance of the entity knowledge entry "PSO00000001." In the textual presentation pattern of the knowledge entries in the knowledge base, the plurality of knowledge entries may be arranged based on the order of the identification numbers. Hereinafter, for ease of understanding, a storage system will be illustrated as an example of a product to be tested. It should be understood that this is not limiting and that test case generation according to embodiments of the present disclosure may also be performed for other different systems, such as a network system.

In some embodiments, these knowledge entries may include, but are not limited to, an entity knowledge entry, an instance knowledge entry, a session knowledge entry, an action knowledge entry, a condition knowledge entry, or a state knowledge entry, and the individual knowledge entries may have an associative relationship with each other. Various types of knowledge entries in the knowledge base and the associative relationships among them will be described below with reference to FIG. 4A.

Figure 4A:
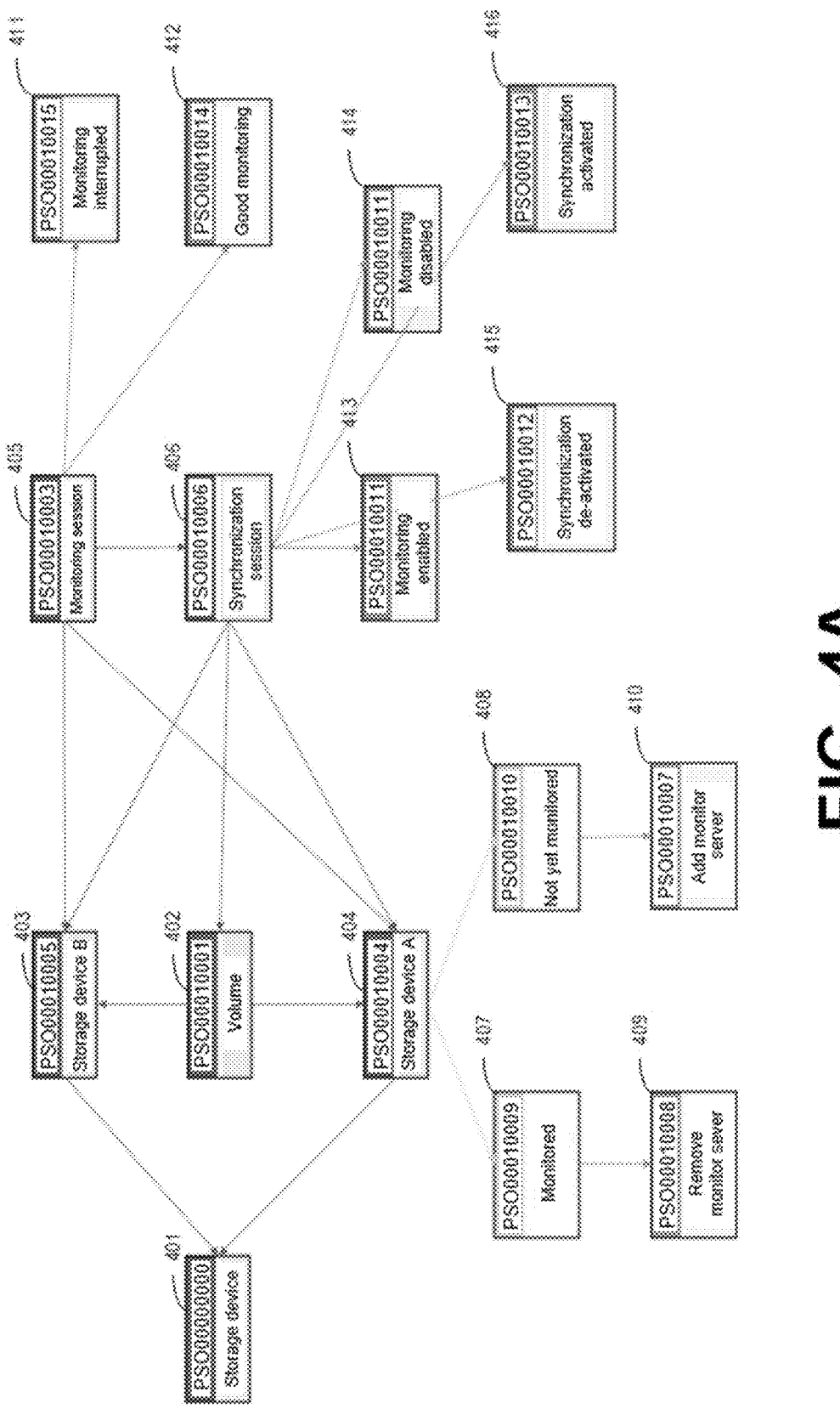
FIG. 4A is a diagram illustrating knowledge entries in a knowledge base in a graphical presentation model according to an embodiment of the present disclosure.

FIG. 4A is a diagram illustrating knowledge entries in a knowledge base in a graphical presentation model according to an embodiment of the present disclosure. As shown in FIG. 4A, the knowledge base for the storage system may include a plurality of knowledge entries. Knowledge entries 401 and 402 may be entity knowledge entries corresponding to a storage device and a volume, respectively. Knowledge entries 403 and 404 may be instance knowledge entries corresponding to the entity knowledge entry 402. For example, the instance knowledge entry 403 indicates a storage device B (also referred to as a cluster B) serving as a data backup end, while the instance knowledge entry 404 indicates a storage device A (also referred to as storage device A) serving as a data generation end. Knowledge entries 405 and 406 may be session knowledge entries. For example, the synchronization session knowledge entry 406 is configured to perform data synchronization from the instance knowledge entry 403 to the instance knowledge entry 404, and the monitoring session knowledge entry 405 is configured to monitor that synchronization process. Knowledge entries 409 and 410 may be action knowledge entries corresponding to the monitoring session knowledge entry 405, such as the remove-monitor-server action knowledge entry 409 and the add-monitor-server action knowledge entry 410, which have execution conditions, respectively, as shown in FIG. 4A. Knowledge entries 407 and 408 may be condition knowledge entries corresponding to the action knowledge entries 409 and 410, respectively, such as the monitored session condition knowledge entry 407 and the not-yet-monitored session condition knowledge entry 408. Subsequent actions are allowed to be executed only if the corresponding conditions are satisfied. In addition, knowledge entries 411 to 416 are state knowledge entries indicating states of the corresponding knowledge entries.

The respective knowledge entries may have an associative relationship with each other. In some embodiments, the associative relationship may include, but is not limited to, a sequential relationship, a conditional relationship, a causal relationship, and the like. By way of illustration but not limitation, the monitoring session knowledge entry 405 is arranged before the synchronization session knowledge entry 406 based on a sequential relationship between the monitoring session knowledge entry 405 and the synchronization session knowledge entry 406. The monitored action knowledge entry is arranged after the not-yet-monitored condition knowledge entry based on a conditional relationship between the add-monitor-server action knowledge entry 410 (also referred to as monitoring action knowledge entry for short) and the not-yet-monitored session condition knowledge entry 408 (also referred to as not-yet-monitored condition knowledge entry for short). In addition, the monitoring session knowledge entry 405 is arranged before a good session condition knowledge entry 412 based on a causal relationship between the monitoring session knowledge entry 405 and the good session condition knowledge entry 412. Furthermore, the associative relationship is illustrative and not exhaustive, which may further include, for example, an exclusive relationship between a monitoring enabled state knowledge entry 413 and a monitoring disabled state knowledge entry 414, a coordinating relationship between the storage device indicated by instance knowledge entry 403 and the storage device indicated by instance knowledge entry 404, and the like.

Returning to FIG. 3, according to embodiments of the present disclosure, in the knowledge base updating sub-process 320, updated knowledge corresponding to the developed target function may be determined in the knowledge base. In response to the target function being developed, the knowledge base will synchronize such a change to the system and store the updated knowledge corresponding to the change. For example, an updated knowledge entry indicating the updated knowledge may be generated based on the additional part in the development document.

To determine which part of the current knowledge in the knowledge base for the system is the updated knowledge, in some embodiments, a current knowledge entry for the system may be compared with a historical knowledge entry before the target function is developed, and a difference between the current knowledge entry and the historical knowledge entry may be identified as the updated knowledge entry. The knowledge entries in the knowledge base may be recorded at a predetermined cycle.

Figure 4B:
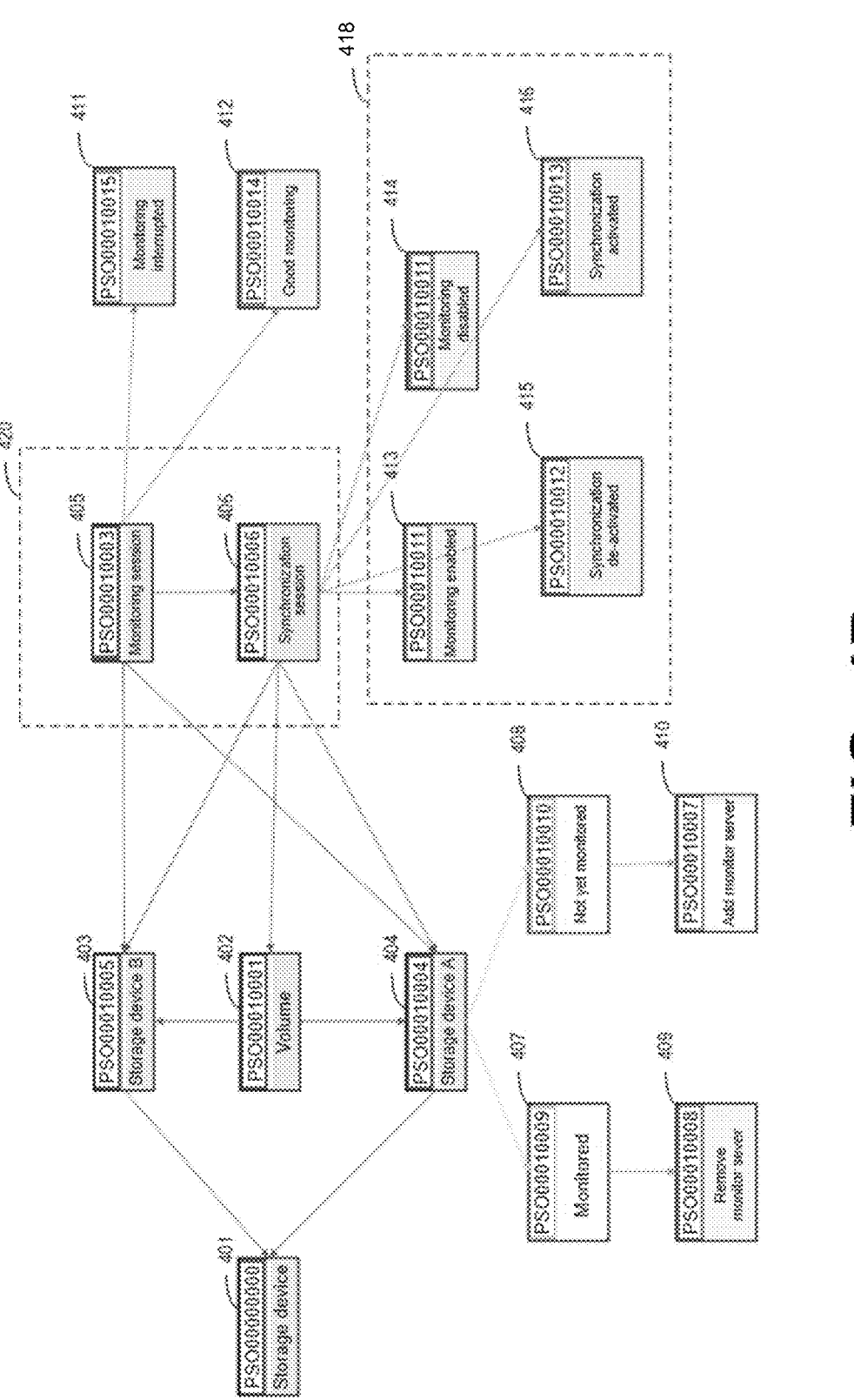
FIG. 4B is a diagram illustrating updated knowledge entries corresponding to developed target functions according to an embodiment of the present disclosure.

FIG. 4B is a diagram illustrating updated knowledge entries corresponding to developed target functions according to an embodiment of the present disclosure. The updated knowledge entry may be identified based on the difference between the knowledge entries before and after the target function is developed. As shown in FIG. 4B, a subset 418 and a subset 420 in the knowledge entries for the system are identified as updated knowledge entries corresponding to the developed target function, which means that the knowledge entries in the subsets 418 and 420 do not exist in the knowledge base for the system before the target function is developed.

Returning to FIG. 3, according to embodiments of the present disclosure, in the test path identification sub-process 330, one or more test paths are identified in the knowledge base for the system from the updated knowledge entries. In some embodiments, a predetermined number of knowledge entries associated with an updated knowledge entry in the current knowledge entries for the system may be identified upstream and downstream of the updated knowledge entry, for example, another knowledge entry that will inevitably be performed when one updated knowledge entry is performed, or some other knowledge entries with a relatively high degree of association to some updated knowledge entries. Here, the predetermined number is indicated by the predetermined test range. In other words, as needed, several knowledge entries upstream or downstream of a particular updated knowledge entry can be selected, or it can also go back to its starting and ending points. In addition, based on the associative relationship (e.g., the sequential relationship, the conditional relationship, and the causal relationship) between the identified updated knowledge entries and their associated knowledge entries, the knowledge entries can be adjusted to form the corresponding test paths, e.g., by clarifying the sequence between them.

Figure 5:
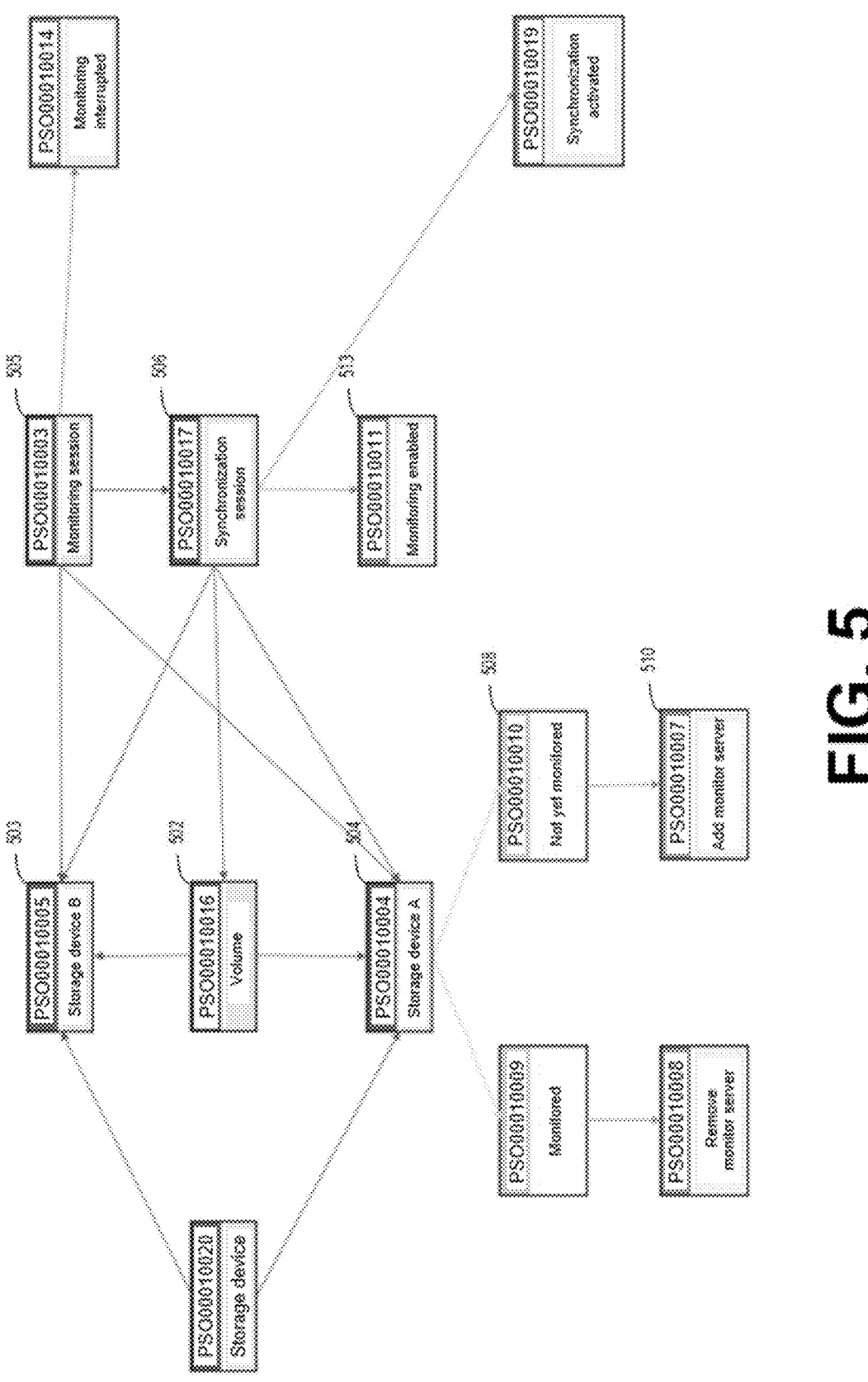
FIG. 5 is a diagram illustrating a test path for identification according to an embodiment of the present disclosure.

FIG. 5 is a diagram illustrating a test path for identification according to an embodiment of the present disclosure. As shown in FIG. 5, an example test path may include knowledge entries 505, 506, 502, 503, and 504, where the knowledge entries 505 and 506 are the identified updated knowledge entries. It should be understood that the length of a test path may be prolonged or shortened depending on test requirements. For example, knowledge entries 508, 510, and 513 may also be added in the above test path as a new test path in the case of high requirements for test precision.

Returning to FIG. 3, according to embodiments of the present disclosure, in the test case generation sub-process 340, a test object is extracted from the identified one or more test paths, and a test case for the target function is generated based on the extracted test object. In some embodiments, the test object includes an action object, an upstream knowledge entry of the action knowledge entry corresponding to the action object may be traced in a corresponding test path and used as an input, and a downstream knowledge entry of the action knowledge entry may be traced in the corresponding test path and used as an output. The action knowledge entry, the input, and the output may then be integrated into structured data in a portable syntactic format, such as action (input, output).

In some other embodiments, the test object includes a state object. A validation action knowledge entry before a state knowledge entry corresponding to the state object may be traced in a corresponding test path, and an upstream knowledge entry of the validation action knowledge entry may be traced in the corresponding test path and used as a resource. The validation action knowledge entry, the resource, and the state knowledge entry are then integrated into structured data in a portable syntax format, such as validation (resource, resource). The formation of structured data will be further described below with reference to FIG. 6.

FIG. 6 is a diagram illustrating an algorithm for forming structured data corresponding to an extracted test object according to an embodiment of the present disclosure. For ease of reference and citation, the algorithm will be referred to simply as Algorithm 1. As shown in FIG. 6, scenario 1 refers to a case in which the above-described test object is an action object, and scenario 2 refers to a case in which the above-described test object is a state object. By means of Algorithm 1, one or more structured data action (input, output) (or, validation (resource, resource)) may be determined for each test path, and a final output of the algorithm may be a file in a portable syntax format of the structured data for all the test paths.

After the structured data is obtained via Algorithm 1, a descriptive statement may be generated based on the obtained structured data, and finally a test case is generated. FIG. 7 is a diagram illustrating an algorithm for generating a descriptive statement according to an embodiment of the present disclosure. For ease of reference and citation, the algorithm will be referred to simply as Algorithm 2. Algorithm 2 illustratively but not restrictively shows four syntaxes (also referred to as patterns), as shown in FIG. 7. With Algorithm 2, a descriptive statement of the desired syntax can be generated based on structured data from each test path. It should be understood that embodiments of the present disclosure are not limited to this, and other different natural language processing means may also be employed according to specific usage requirements (e.g., language requirements (Chinese, English, etc.)), as well as other syntaxes different from the exemplified syntax. In FIG. 7 and other figures and description herein, PSO denotes Power Store Ontology, which is an illustrative example ontology, although it is to be appreciated that other ontologies could be used.

After the descriptive statement is generated, the entry name may be utilized to annotate at an appropriate location of the statement. FIG. 8 is a diagram illustrating an example of descriptive statements generated according to an embodiment of the present disclosure. As shown in FIG. 8, appropriate locations in the generated descriptive statements are annotated with entry names, such as in square brackets. It should be understood that embodiments of the present disclosure are not limited to this, and other desired information may also be annotated, or the annotations may be omitted. The test case for the target function of the system can be generated by performing predetermined post-processing on the generated descriptive statements, and such post-processing includes, but is not limited to, punctuation processing, word segmentation processing, text vectorization, and the like.

FIG. 9 is a block diagram of an example device 900 that may be used to implement some embodiments of the present disclosure. As shown in FIG. 9, the device 900 includes a central processing unit (CPU) 901 that can perform various appropriate actions and processing according to computer program instructions stored in a read-only memory (ROM) 902 or computer program instructions loaded from a storage unit 908 into a random access memory (RAM) 903. Various programs and data required for the operation of the device 900 may also be stored in the RAM 903. The CPU 901, the ROM 902, and the RAM 903 are connected to one another through a bus 904. An input/output (I/O) interface 905 is also connected to the bus 904.

A plurality of components in the device 900 are connected to the I/O interface 905 and include: an input unit 906, such as a keyboard and a mouse; an output unit 907, such as various types of displays and speakers; the storage unit 908, such as a magnetic disk and an optical disc; and a communication unit 909, such as a network card, a modem, and a wireless communication transceiver. The communication unit 909 allows the device 900 to exchange information/data with other devices via a computer network such as the Internet and/or various telecommunication networks.

The various processes and processing described above, such as the method 200, may be performed by the CPU 901. For example, in some embodiments, the method 200 may be implemented as a computer software program that is tangibly included in a machine-readable medium such as the storage unit 908. In some embodiments, part or all of the computer program may be loaded and/or installed onto the device 900 via the ROM 902 and/or the communication unit 909. When the computer program is loaded into the RAM 903 and executed by the CPU 901, one or more actions of the method 200 described above may be executed.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semi-conductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

Computer program instructions for performing the operations of the present disclosure may be assembly instructions, Instruction Set Architecture (ISA) instructions, machine instructions, machine-related instructions, microcode, firmware instructions, state setting data, or source code or object code written in any combination of one or more programming languages, including object-oriented programming languages such as Smalltalk and C++, and conventional procedural programming languages such as C language or the like. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by the computer-readable program instructions.

These computer-readable program instructions may be provided to a processing unit of a general-purpose computer, a special-purpose computer, or other programmable data processing apparatuses to produce a machine, such that these instructions, when executed by the processing unit of the computer or other programmable data processing apparatuses, produce means for implementing the functions/acts specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored thereon includes an article of manufacture that includes instructions that implement various aspects of the functions/actions specified in one or more blocks in the flow charts and/or block diagrams.

The computer-readable program instructions may also be loaded onto a computer, other programmable data processing apparatuses, or other devices, such that a series of operational steps are performed on the computer, other programmable data processing apparatuses, or other devices to produce a computer-implemented process, such that the instructions executed on the computer, other programmable data processing apparatuses, or other devices implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on the involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms used herein is intended to best explain the principles and practical applications of the various embodiments and their associated technical improvements, so as to enable persons of ordinary skill in the art to understand the embodiments disclosed herein.

What is claimed is:

1. A method for test case generation, comprising:

in response to a target function of a system being developed, determining updated knowledge, corresponding to the target function, in a knowledge base for the system;

identifying at least one test path from the updated knowledge in the knowledge base based on a predetermined test range for the target function; and extracting a test object from each of the at least one test path to generate a test case for the target function;

wherein determining the updated knowledge comprises:

comparing a current knowledge entry for the system with a historical knowledge entry, the historical knowledge entry being prior to development of the target function; and determining a difference between the current knowledge entry and the historical knowledge entry as an updated knowledge entry; and wherein identifying at least one test path from the updated knowledge comprises:

identifying a plurality of knowledge entries associated with the updated knowledge entry, including one or more knowledge entries upstream of the updated knowledge entry and one or more knowledge entries downstream of the updated knowledge entry, the plurality of knowledge entries being indicated by the predetermined test range; and adjusting at least a subset of the identified knowledge entries based on at least one associative relationship between the identified knowledge entries to form a corresponding test path.

2. The method according to claim 1, wherein the knowledge base comprises at least one knowledge entry about the system, and the at least one knowledge entry comprises at least one of the following: an entity knowledge entry, an instance knowledge entry, a session knowledge entry, an action knowledge entry, a condition knowledge entry, or a state knowledge entry; and each of the at least one knowledge entry comprises at least one of the following: an identification number, a name, a label, an attribute, a description, or an annotation.

3. The method according to claim 1, wherein the at least one associative relationship comprises at least one of: a sequential relationship, a conditional relationship, and a causal relationship.

4. The method according to claim 3, wherein the system comprises a storage system, and adjusting at least a subset of the identified knowledge entries comprises:

arranging a monitoring session knowledge entry before a synchronization session knowledge entry based on a sequential relationship between the monitoring session knowledge entry and the synchronization session knowledge entry;

arranging a monitoring action knowledge entry after a not-yet-monitored condition knowledge entry based on a conditional relationship between the monitoring action knowledge entry and the not-yet-monitored condition knowledge entry; and arranging the monitoring session knowledge entry before a good session state knowledge entry based on a causal relationship between the monitoring session knowledge entry and the good session state knowledge entry.

5. The method according to claim 1, wherein the test object comprises an action object, the method further comprising:

tracing an upstream knowledge entry of an action knowledge entry corresponding to the action object in a corresponding test path, and using it as an input;

tracing a downstream knowledge entry of the action knowledge entry in the corresponding test path, and using it as an output; and integrating the action knowledge entry, the input, and the output into structured data in a portable syntax format.

6. The method according to claim 1, wherein the test object comprises a state object, the method further comprising:

tracing a validation action knowledge entry before a state knowledge entry corresponding to the state object in a corresponding test path;

tracing an upstream knowledge entry of the validation action knowledge entry in the corresponding test path, and using it as a resource; and integrating the validation action knowledge entry, the resource, and the state knowledge entry into structured data in a portable syntax format.

7. The method according to claim 1, further comprising:

generating a descriptive statement based on structured data in a portable syntax format corresponding to the test object; and adding an annotation to the generated descriptive statement.

8. The method according to claim 1, wherein:

a knowledge entry included in the knowledge base is generated based on a development document for the system; and the knowledge entry included in the knowledge base is presented in at least one of the following patterns: a graphical presentation pattern or a textual presentation pattern.

9. An electronic device, comprising:

at least one processor; and memory, the memory being coupled to the at least one processor and storing instructions, wherein the instructions, when executed by the at least one processor, cause the electronic device to perform actions comprising:

in response to a target function of a system being developed, determining updated knowledge, corresponding to the target function, in a knowledge base for the system;

identifying at least one test path from the updated knowledge in the knowledge base based on a predetermined test range for the target function; and extracting a test object from each of the at least one test path to generate a test case for the target function;

wherein determining the updated knowledge comprises:

comparing a current knowledge entry for the system with a historical knowledge entry, the historical knowledge entry being prior to development of the target function; and determining a difference between the current knowledge entry and the historical knowledge entry as an updated knowledge entry; and wherein identifying at least one test path from the updated knowledge comprises:

identifying a plurality of knowledge entries associated with the updated knowledge entry, including one or more knowledge entries upstream of the updated knowledge entry and one or more knowledge entries downstream of the updated knowledge entry, the plurality of knowledge entries being indicated by the predetermined test range; and adjusting at least a subset of the identified knowledge entries based on at least one associative relationship between the identified knowledge entries to form a corresponding test path.

10. The electronic device according to claim 9, wherein the knowledge base comprises at least one knowledge entry about the system, and the at least one knowledge entry comprises at least one of the following: an entity knowledge entry, an instance knowledge entry, a session knowledge entry, an action knowledge entry, a condition knowledge entry, or a state knowledge entry; and each of the at least one knowledge entry comprises at least one of the following: an identification number, a name, a label, an attribute, a description, or an annotation.

11. The electronic device according to claim 9, wherein the at least one associative relationship comprises at least one of: a sequential relationship, a conditional relationship, and a causal relationship.

12. The electronic device according to claim 11, wherein the system comprises a storage system, and adjusting at least a subset of the identified knowledge entries comprises:

arranging a monitoring session knowledge entry before a synchronization session knowledge entry based on a sequential relationship between the monitoring session knowledge entry and the synchronization session knowledge entry;

arranging a monitoring action knowledge entry after a not-yet-monitored condition knowledge entry based on a conditional relationship between the monitoring action knowledge entry and the not-yet-monitored condition knowledge entry; and arranging the monitoring session knowledge entry before a good session state knowledge entry based on a causal relationship between the monitoring session knowledge entry and the good session state knowledge entry.

13. The electronic device according to claim 9, wherein the test object comprises an action object, and the actions further comprise:

tracing an upstream knowledge entry of an action knowledge entry corresponding to the action object in a corresponding test path, and using it as an input, tracing a downstream knowledge entry of the action knowledge entry in the corresponding test path, and using it as an output; and integrating the action knowledge entry, the input, and the output into structured data in a portable syntax format.

14. The electronic device according to claim 9, wherein the test object comprises a state object, and the actions further comprise:

tracing a validation action knowledge entry before a state knowledge entry corresponding to the state object in a corresponding test path;

tracing an upstream knowledge entry of the validation action knowledge entry in the corresponding test path, and using it as a resource; and integrating the validation action knowledge entry, the resource, and the state knowledge entry into structured data in a portable syntax format.

15. The electronic device according to claim 9, wherein the actions further comprise:

generating a descriptive statement based on structured data in a portable syntax format corresponding to the test object; and adding an annotation to the generated descriptive statement.

16. The electronic device according to claim 9, wherein:

a knowledge entry included in the knowledge base is generated based on a development document for the system; and the knowledge entry included in the knowledge base is presented in at least one of the following patterns: a graphical presentation pattern or a textual presentation pattern.

17. A computer program product comprising a non-transitory computer-readable medium having computer-executable instructions stored therein, wherein the computer-executable instructions, when executed by at least one processor of a computer, cause the computer to perform actions comprising:

in response to a target function of a system being developed, determining updated knowledge, corresponding to the target function, in a knowledge base for the system;

identifying at least one test path from the updated knowledge in the knowledge base based on a predetermined test range for the target function; and extracting a test object from each of the at least one test path to generate a test case for the target function;

wherein determining the updated knowledge comprises:

comparing a current knowledge entry for the system with a historical knowledge entry, the historical knowledge entry being prior to development of the target function; and determining a difference between the current knowledge entry and the historical knowledge entry as an updated knowledge entry; and wherein identifying at least one test path from the updated knowledge comprises:

identifying a plurality of knowledge entries associated with the updated knowledge entry, including one or more knowledge entries upstream of the updated knowledge entry and one or more knowledge entries downstream of the updated knowledge entry, the plurality of knowledge entries being indicated by the predetermined test range; and adjusting at least a subset of the identified knowledge entries based on at least one associative.

18. The computer program product according to claim 17, wherein the test object comprises an action object, and the computer-executable instructions further cause the computer to perform actions comprising:

tracing an upstream knowledge entry of an action knowledge entry corresponding to the action object in a corresponding test path, and using it as an input;

tracing a downstream knowledge entry of the action knowledge entry in the corresponding test path, and using it as an output; and integrating the action knowledge entry, the input, and the output into structured data in a portable syntax format.

19. The computer program product according to claim 17, wherein the at least one associative relationship comprises at least one of: a sequential relationship, a conditional relationship, and a causal relationship.

20. The computer program product according to claim 19, wherein the system comprises a storage system, and adjusting at least a subset of the identified knowledge entries comprises:

arranging a monitoring session knowledge entry before a synchronization session knowledge entry based on a sequential relationship between the monitoring session knowledge entry and the synchronization session knowledge entry;

arranging a monitoring action knowledge entry after a not-yet-monitored condition knowledge entry based on a conditional relationship between the monitoring action knowledge entry and the not-yet-monitored condition knowledge entry; and arranging the monitoring session knowledge entry before a good session state knowledge entry based on a causal relationship between the monitoring session knowledge entry and the good session state knowledge entry.

\* \* \* \* \*